SOUND RECORDING AND REPRODUCTION

Filed July 27, 1949

INVENTOR.
Gustav Bergson
BY Carl R. Goshaw
ATTORNEY.

Patented Jan. 20, 1953 2,626,320

UNITED STATES PATENT OFFICE 2,626,320

SOUND RECORDING AND REPRODUCTION

Gustav Bergson, Philadelphia, Pa., assignor to Radio Corporation of America, a corporation of Delaware Application July 27, 1949, Serial No. 107,034

7 Claims. (Cl. 179—100.3)

This invention relates to sound recording and reproduction, and particularly to the recording of sound on film, either photographically or mechanically.

Photographic recording on emulsions carried by motion picture film is well-known, such recordings being of two major types, namely, variable area recording, whereby the width of a transparent area varies with the amplitude of the signal, and the variable density type of recording, whereby the density of the record varies with the amplitude of the signal. The present invention is directed to a recording system whereby two, narrow, transparent lines vary in separation in accordance with the amplitude of the signal, these lines being made by exposing and processing the film or utilizing an opaque film and mechanically cutting the narrow lines therein, so that light may pass through them.

The invention also utilizes the effect of interference between two monochromatic light beams in different and varying lengths of transmission paths, or the color pattern produced by light interference in cooperation with a color selective photoelectric cell, such as is disclosed and claimed in U. S. Patent No. 2,423,254 of July 1, 1947. By the use of these methods and systems of recording and reproduction, the effect of scratches or dirt is reduced to a minium, since the ratio of transparent area to opaque area is very small and remains constant. Also, since the centers of the spots of light dominate the interference operation, distortion effects due to light spill-over are minimized. Furthermore, the effect of film graininess may be substantially eliminated.

The principal object of the invention, therefore, is to facilitate the recording and reproduction of sound.

Another object of the invention is to provide an improved system for recording and/or reproducing sound.

A further object of the invention is to provide an improved recording system wherein the ratio between the opaque area and transparent area of the sound track area is large and remains constant at all signal amplitudes.

A still further object of the invention is to provide an improved sound reproducing system wherein noises caused by scratches, dirt, light spill-over, and film graininess are reduced to a minimum.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figures 1, 2, 3, 4, 5:
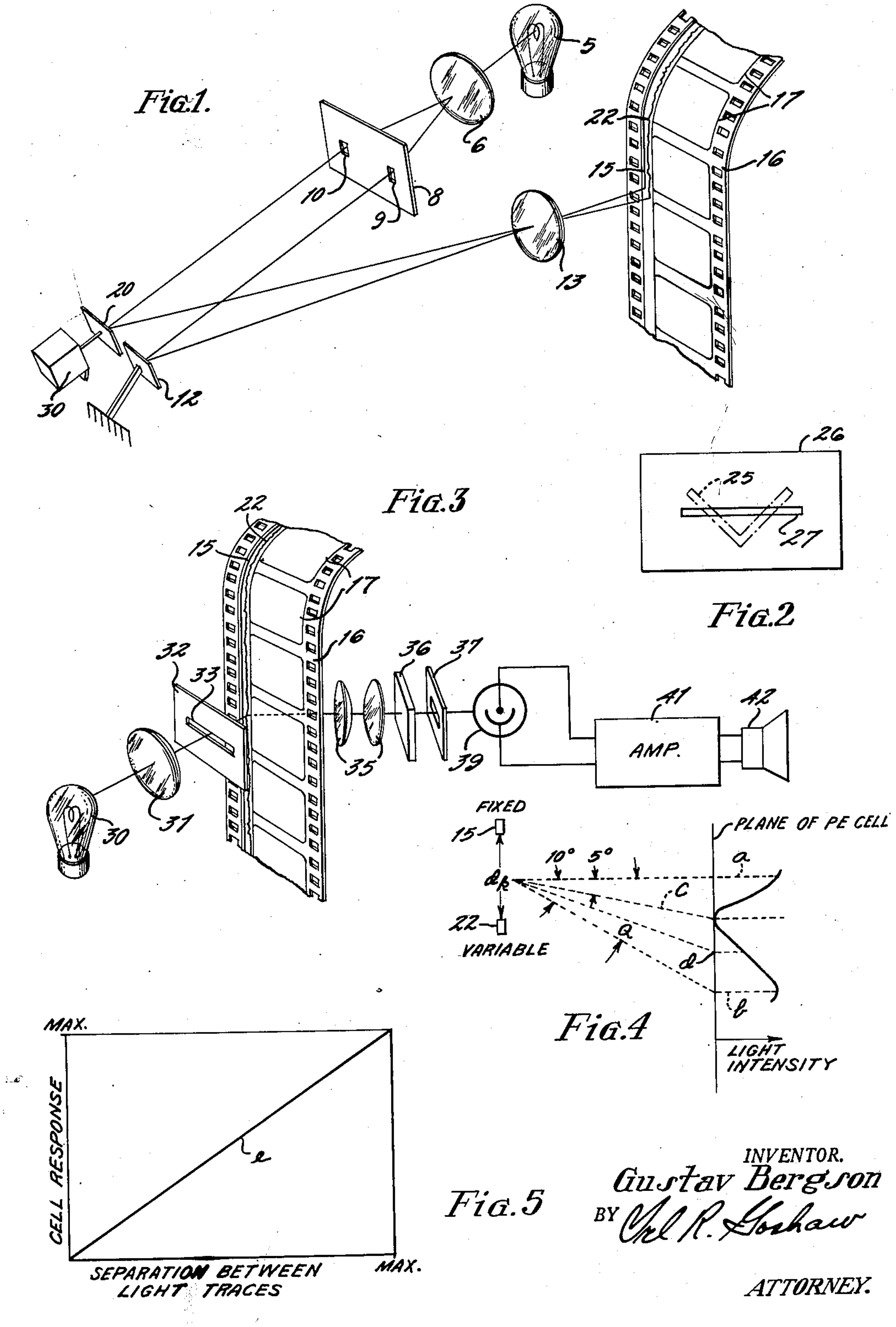
Fig. 1 is a diagrammatic view of a recording system embodying the invention.
Fig. 2 is a detailed view of a slit and light beam showing a modification of the invention.
Fig. 3 is a diagrammatic view of a sound reproducing system embodying the invention.
Fig. 4 is a diagram illustrating the detecting action of the reproducing system of the invention.
Fig. 5 is a graph showing the characteristic between light beam separation and detection response in accordance with the invention.

Referring now to the drawings, in which the same numerals identify like elements, light from a light source 5 is collected by a lens 6 and projected upon an aperture plate 8 having two, small, equal-sized apertures 9 and 10 therein. The light emerging from aperture 9 is received on a fixed mirror 12, from which it is reflected through an objective lens 13 to form straight trace 15 on a film 16, which may or may not contain picture frames 17. Light emerging from aperture 10 is received on a mirror 20, which is oscillated perpendicularly to the motion of the film by galvanometer 30 in accordance with the amplitude and frequency of the signal being recorded. The light from the mirror 20 is projected by projection lens 13 to form the variable trace 22, shown on the sound track portion of the film 16.

This system is simple in operation, in that, as the film is advanced past the two beams, the trace 15 will remain a constant distance from the edge of the film, while the trace 22 will vary in separation from trace 15 in accordance with the amplitude and frequency of the signal being recorded. When the film 16 is developed, the two traces will form opaque lines, which, when printed, will be transparent, the remaining portion of the sound track area being opaque. Thus, regardless of the amplitude of the signal or its frequency, the ratio between the opaque area and transparent area will be large and remain the same. In the case of present-day variable area and variable density recording, the ratio of transparent area to opaque area increases with signal amplitude.

Referring now to Fig. 2, if the aperture plate 8 had a V-shaped slot, it would form a V-shaped light beam, as shown by the broken lines 25, this beam falling on the slit mask 26 with a slit 27 therein. Now, when the light beam 25 is vibrated perpendicularly to the slit 27 in accordance with the amplitude and frequency of the signal being recorded, two traces will be formed in the sound track area, which will approach and recede from one another in proportion to the amplitude of the signal. This modification requires only one mirror 20 and galvanometer 30, which vibrate in the direction of motion of the film instead of perpendicularly thereto. Also, the track formed would have two varying traces and be in the form of a bi-lateral record, instead of a uni-lateral record with a fixed trace and only one variable trace.

Referring now to Fig. 3, illustrating the reproducing system, light from a fixed source 30 is collected by a lens 31 and impressed on a slit mask 32 having a slit 33 therein. The narrow line of light emerging through the slit 33 is impressed on the sound track area of the film 16 and the two beams or spots of light, through the traces 15 and 22, are projected by lenses 35 through a light filter 36, the slit of a mask 37, to a photoelectric cell 39. The photoelectric cell is connected through an amplifier 41 to a speaker 42. By the use of filter 36, a monochromatic light, such as green, having a wavelength of approximately 5000 angstrom units, will be impressed on the cell 39.

The manner of detecting the light is based on the interference pattern between the beam passing through the trace 15 and the beam passing through the trace 22 at different distances of separation. As shown in Fig. 4, the fixed trace 15 and variable trace 22 are shown in one position of separation.

For a general determination of the photoelectric cell position, let it be assumed that the traces 15 and 22 are separated from each other in steps of small, equal increments. In such case, $$d_k \sin Q = \lambda_k \qquad (1)$$

and, to a high degree of approximation, $$\Delta d_k \sin Q = \Delta\lambda_k \qquad (2)$$

where $d_k$ is the separation of the traces 15 and 22 at zero signal, Q is the angle of the first maximum with respect to the center line between the two trace positions at zero signal, and $\lambda_k$ is the wavelength of the light illuminating the cell 39, and which has this first maximum at angle Q at zero signal. Therefore, for a linear quantized recording system (that is, $\Delta d_k$ is proportional to signal intensity), the light band separation must be uniform in wavelength and the absorption of the filter must be a linear function of the wavelength. Thus, the over-all product of band intensity, photocell sensitivity, and filter absorption is the factor which is a linear function of the wavelength. For green light, as mentioned above, the first maximum is at *b*, approximately ten degrees off the above-mentioned center line, which is the normal to the film at the base line, as shown by dotted line *a* in Fig. 4. The preceding minimum is approximately five degrees off the normal, as shown by dotted line *c*. The cell 39 is now placed mid-way between these positions *b* and *c*; that is, at point *d* in Fig. 4. Since a substantial linear relationship exists between maximum and minimum points, the cell response with light trace separation will follow the curve *e* in Fig. 5.

When non-monochromatic light is used, such as a wavelength band between 4000 and 6000 angstrom units, the cell position is determined by the equation:

$$B \cdot S \cdot A = K \cdot \lambda$$

where B is the band intensity at wavelength $\lambda$, S is the photocell sensitivity at wavelength $\lambda$, and A is the filter absorption at wavelength $\lambda$. Thus, increased beam separation causes longer wavelengths to illuminate the photocell, and high level sounds correspond to longer wavelengths as illustrated in the above mentioned patent. Thus, the output of photocell 39 is dependent upon the ratio or difference in the length of the light transmission paths from the traces as they vary in separation.

The above system, therefore, provides a sound recording and reproducing system which has a minimum of distortion due to scratches and dirt on the record carrier or light spill-over at the film. If the film is opaque, a fixed stylus could cut trace 15 and a stylus varying with the amplitude and frequency of a signal could cut trace 22, thus providing a mechanical recorder, the light beams passing through the traces being reproducible in the same manner as photographically produced traces.

I claim:

1. A sound recording system comprising means for producing a plurality of light beams, a film having a light sensitive emulsion thereon, and means for projecting said beams to said emulsion, said last mentioned means including means for varying the separation of said beams on said emulsion in accordance with the amplitude and frequency of a signal being recorded, and said first mentioned means including a mask with a V-shaped aperture therein and a mask with a straight slit therein on which light from said aperture is projected to provide on a print two transparent traces narrow with respect to the opaque portion of said emulsion.

2. A sound reproducing system comprising a film having thereon a pair of narrow light traces varying in separation in accordance with the amplitude and frequency of a signal, said traces being transparent and of a small width compared with the opaque portion of said film, means for forming a narrow light beam, means for projecting said narrow beam on said film, a photocell, a filter between said film and said photocell to predetermine the wavelengths of the light impressed on said photocell, and means for positioning said photocell in a position so that the light paths of the beams emerging from said film have different lengths varying with the separation between said beams and coincident at some point between said photocell and said filter.

3. A sound reproducing system for reproducing sound from a pair of light beams whose separation varies in accordance with the amplitude and frequency of a signal comprising a film having a pair of transparent traces thereon varying in separation, the transparent area of said traces being small with respect to the opaque area of said film, means for obtaining light beams corresponding to the position of said traces transversely of said film at any particular instant, a photocell, and optical means for projecting on said photocell said light beams at an angle to a line perpendicular to said film and along different length paths, said beams coinciding at some point along their paths, the ratio of the variation in length of said paths determining the output of said photocell.

4. A sound reproducing system for reproducing sound from a pair of light beams whose separation varies in accordance with the amplitude and frequency of a signal comprising a film having a pair of traces thereon varying in separation, the transparent portion of said traces being small in comparison with the opaque portion of said film, means for obtaining light beams corresponding to the position of said traces at any particular instant, a photocell, and means for projecting on said photocell said light beams along different length paths, said paths coinciding at some point along their lengths, the ratio of the variation in lengths of said paths determining the output of said photocell, said last mentioned means including a light filter and optical means positioned at an angle to a line perpendicular to said film.

5. A sound reproducing system for reproducing sound from a pair of light beams whose separation varies in accordance with the amplitude and frequency of a signal comprising a film having a pair of traces thereon varying in separation, the transparent area of said traces being small in comparison with the opaque area of said film, means for obtaining light beams corresponding to the position of said traces at any particular instant, a photocell, and means for projecting on said photocell said light beams along different length paths, said paths coinciding at some point along their lengths, the ratio of the variation in lengths of said paths determining the output of said photocell, said last mentioned means including a light-filter transmitting light having a wavelength of approximately 5000 angstrom units.

6. A system for detecting a sound record consisting of a pair of longitudinal traces varying in separation in accordance with the amplitude and frequency of a signal, said traces being transparent and the area of said traces being small compared with the opaque area of said sound record, comprising means for generating a pair of beams varying in separation at said record in accordance with the separation of said traces, means for projecting said beams to a common point along different length paths, the difference between the lengths of said paths being determined by the separation of said beams at said record, said beams coinciding at some point along their different length paths, and means for detecting the interference between said beams at said common point.

7. A system for detecting a sound record having a pair of light passing traces which vary in separation in accordance with the frequency and amplitude of a sound signal comprising means for producing light sources at points on said traces transversely of said record, projecting means for substantially monochromatic light from said sources as light beams along different length paths to a common point, and means for detecting the varying light intensity at said point produced by the interference of light in said beams.

GUSTAV BERGSON.

REFERENCES CITED

The following references are of record in the file of this patent:

UNITED STATES PATENTS

| Number | Name | Date |
|---|---|---|
| 1,840,791 | Page | Jan. 12, 1932 |